United States Patent [19]

Stockdale et al.

[11] Patent Number: 4,923,423

[45] Date of Patent: May 8, 1990

[54] INTEGRATED THERMAL PROCESSING FOR KINESCOPES

[75] Inventors: George F. Stockdale; Harvey O. Hook, both of Princeton; Robert G. Browne, Fords; Philip M. Heyman, Robbinsville, all of N.J.

[73] Assignee: RCA Licensing Corporation, Princeton, N.J.

[21] Appl. No.: 373,556

[22] Filed: Jun. 30, 1989

[51] Int. Cl.⁵ ............................................. H01J 9/26
[52] U.S. Cl. .................................. 445/40; 65/43; 445/45
[58] Field of Search ............... 445/40, 45, 59, 70; 65/43

[56] References Cited

U.S. PATENT DOCUMENTS

| | | | |
|---|---|---|---|
| 2,861,392 | 11/1958 | Vincent | 445/45 |
| 3,894,858 | 7/1975 | Rogers | 445/45 |
| 4,194,643 | 5/1980 | Hager et al. | 65/43 |
| 4,498,884 | 2/1985 | Stover et al. | 445/45 |
| 4,832,645 | 5/1989 | Verhagen | 445/45 X |

FOREIGN PATENT DOCUMENTS 361095  5/1962  Switzerland .......................... 65/43

Primary Examiner—Kenneth J. Ramsey
Attorney, Agent, or Firm—J. S. Tripoli; D. H. Irlbeck; L. L. Hallacher

[57] ABSTRACT

In an integrated thermal processing method the bulb is completely processed in a dedicated oven. The inside and outside of the bulb are simultaneously heated. The inside and outside are also simultaneously cooled. During the evacuation a temperature gradient is maintained across the face of the panel to reduce tensile stresses which develop in the bulb skirt area during evacuation.

20 Claims, 1 Drawing Sheet

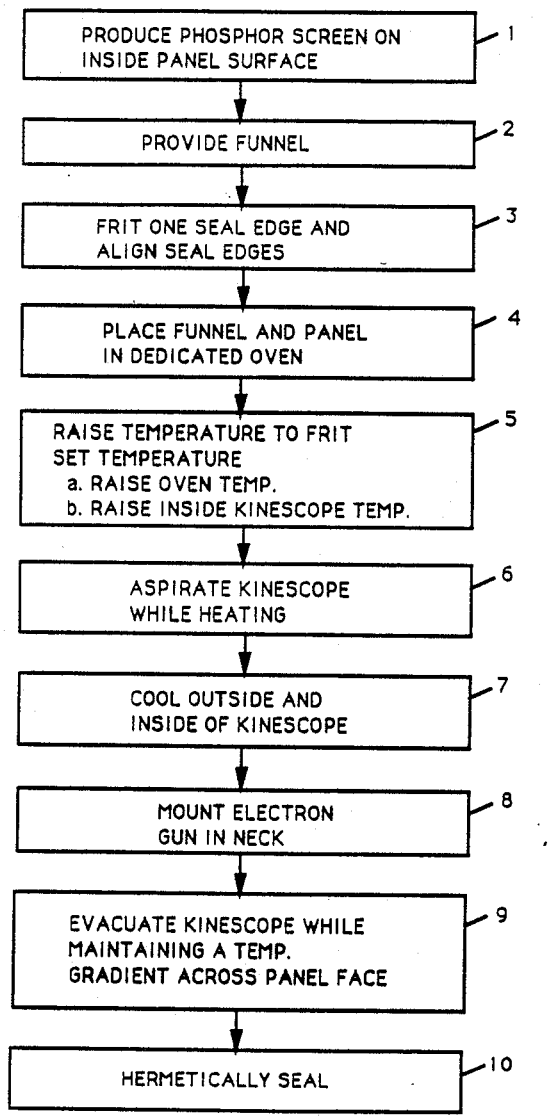

INTEGRATED THERMAL PROCESSING FOR KINESCOPES

BACKGROUND

This invention relates generally to the production of kinescopes and particularly to an integrated thermal processing method for such production.

The production of color television picture tubes (kinescopes) is a very complex procedure employing literally hundreds of processing steps. Among the processing steps are those of producing a phosphor screen on the inside surface of a faceplate panel. The phosphor screen includes three different phosphors each of which produces one of the primary colors of light when impacted by electrons. The phosphor layer is coated with a layer of organic compound which provides a smooth surface so that a thin layer of aluminum can be applied to the screen. The aluminum coating is used to electrically connect the phosphor screen to the anode voltage supply and to a selection electrode (shadow mask) which causes each of three electron beams to impact the phosphor of the proper light emitting color. The aluminum layer also enhances the brightness of the image on the screen by reflecting toward the viewer light generated by the phosphor and which is directed toward the interior of the tube. After the aluminum layer is applied to the screen the panel assembly is heated to a temperature exceeding 300° C. (cap bake) to remove the organic layer from the panel. The cap baking step is essential because organic substances remaining in the tube would adversely affect the subsequent processing of the tube. After the cap bake is completed, the shadow mask is inserted and the panel is ready to be joined to a funnel in preparation of being assembled into a finished kinescope.

The completed panel is permanently affixed to the open end of the funnel portion by applying a bead of low temperature melting glass frit material to the seal edge of either the panel or the funnel. The seal edges of the panel and funnel are mated and the assembly is raised to a temperature between 430° and 450° C. (frit seal temperature) to melt and crystalline the frit material and to permanently and hermetically seal the panel and funnel into an integral bulb.

An electron gun is mounted into the neck of the funnel portion and the bulb is heated to a temperature of about 300° C. while being evacuated to the low internal pressure required for the proper operation of the kinescope. After the bulb is satisfactorily evacuated, the pumping port is hermetically sealed and the bulb continues on to other processing stages. Typically, the processing steps briefly described above are carried out while the various components move along conveyor lines and a large number of bulbs are continuously and simultaneously processed. Accordingly, each of the three heating operations, that is cap bake, frit seal and evacuation are effected in large ovens when a large number of bulbs are processed. Three individual heating steps are therefore employed during the production of each bulb. The use of separate heating stages is expensive, inefficient and time consuming. Also, because a large number of bulbs are continuously processed through the ovens, various processing techniques which can be effective in producing cleaner bulbs and in reducing thermal stresses in the bulbs cannot be utilized. A clean bulb contributes to increased bulb life and higher performance. Lowering thermal stresses reduces the probability of catastrophic implosion. For these reasons, there is a need for a method of producing kinescope bulbs which are scrupulously clean internally and which reduces thermal stresses, and which is substantially improved in efficiency and therefore is less expensive and less time consuming. The present invention fulfills these needs.

SUMMARY

A method of making a kinescope includes the steps of producing a phosphor screen coated with an organic material on the inside surface of a panel and supporting the panel and a funnel in a dedicated oven with the neck of the funnel extending through one wall of the oven. The funnel and panel are heated above the set temperature of the frit material to form a kinescope bulb by simultaneously heating the inside and outside of the bulb, and by maintaining the heating for a time period sufficient to set the frit material. The kinescope bulb is aspirated during the heating to remove organics and to create a negative pressure inside the kinescope bulb whereby air pressure presses the panel onto the funnel to improve the frit seal. The inside and outside of the bulb are simultaneously cooled. An electron gun is mounted in the kinescope bulb when the kinescope bulb is cooled to a predetermined temperature below the set temperature of the frit material. The kinescope bulb is evacuated while a temperature gradient is maintained across the face of the panel to reduce stresses caused by the evacuation. The kinescope bulb is then hermetically sealed.

BRIEF DESCRIPTION OF THE DRAWINGS

The FIGURE is a flow chart of a preferred embodiment.

DETAILED DESCRIPTION

In the FIGURE, in steps 1 through 4, a completed panel, having a phosphor screen on the inside surface, and a funnel are placed together with a bead of frit material around the seal of either the panel or the funnel. The seal edges are aligned and the assembly is placed into a dedicated oven in which only a single tube is processed at a time. Typically, the neck of the funnel extends downwardly so that the longitudinal axis of the bulb is in a vertical position. The panel and funnel are supported, in a conventional manner, within the dedicated oven to maintain the proper alignment of the components. The neck of the funnel portion extends through one wall, typically the bottom, of the oven to provide access to the bulb for the other processing steps.

In step 5 the faceplate/funnel assembly (bulb) is heated at a controlled rate to the set (cure) temperature of the frit material. Typically the frit set temperature is 430° C. to 450° C. Heating the bulb to this temperature must be done gradually in a controlled cycle. Rapidly heating the glass causes substantial thermal stresses because the inside of the bulb is heated by conduction through the glass and therefore the inside of the bulb heats much more slowly than the outside of the bulb. With the invention, the inside of the bulb is heated at substantially the same rate as the outside of the bulb to greatly reduce the thermal stresses. Preferably, the internal heating is accomplished by blowing heated gas, such as air, into the tube while the outside of the tube is also being heated, although other internal heating devices can be used. The inside temperature is raised by increasing the temperature of the gas being blown into the tube at substantially the same rate as that of heating of the outside of the tube. Preferably, gas is blown into the tube by inserting a hollow rod into the tube through the neck of the tube. The external heating of the bulb can be done utilizing either radiant energy, such as with resistance heaters arranged within the dedicated oven, or by convection, such as by blowing heated air into the oven. The simultaneous heating of both the inside and outside of the glass bulb is effective in maintaining thruwall temperature gradients to a safe value, typically in the order of 10° C. to 20° C. and, thus substantially reduces the stresses produced by typical heating methods which do not include simultaneously heating the inside and outside of the bulb. The reduction in thruwall temperature gradients permits a significant increase in the heating rate and thus reduces the time required to reach the set temperature of the frit material. After the set temperature of the frit material is reached, the set temperature is maintained for a period sufficient to cure the frit material to effect a hermetic seal between the panel and the funnel.

In step 6, the assembly is aspirated during the heating process to realize two significant advantages. First, the aspiration enhances the removal of the organics being driven off during the heating to more effectively remove such organics from the assembly. Also, the aspiration is used to create a slightly negative pressure inside the bulb. The pressure differential presses the panel toward the funnel and deeper into the frit material, and results in a thinner and stronger frit seal. These advantages are attainable because the bulb is in a dedicated oven rather than moving through a large oven on a conveyor, which prohibits connecting aspiration equipment to the large number of bulbs in the oven.

In step 7, the inside and outside of the bulb are simultaneously cooled. The outside cooling is effected by discontinuing the heating and the cooling time can be decreased by exposing the bulb to air at ambient temperature. The internal cooling is effected by blowing a dry gas, such as air, at ambient temperature into the bulb. This can be done by inserting the same rod used to heat the bulb into the bulb and blowing the cooling gas through the rod. The simultaneous cooling of the inside and outside of the bulb has several advantages. First, thruwall temperature gradients are maintained at a safe level because both the inside and outside of the bulb are cooled at substantially the same rate. The reduction of thruwall temperature differentials is quite beneficial because temperature induced stresses are reduced, as explained hereinabove. Additionally, the cooling time is substantially reduced. When the bulb is cooled to a temperature of about 325° C. the cooling gas rod is removed from the inside of the bulb.

In step 8, after the rod is extracted from inside the bulb, an electron gun is permanently mounted in the neck of the bulb. This is a standard operation and the equipment for doing so is conventional in the art.

In step 9, the bulb continues to cool at a controlled rate in the oven, and is evacuated to an internal pressure of about $5 \times 10^{-5}$ mmHg, as is required for the processing and proper operation of a kinescope. The evacuation of the bulb causes substantial stresses to be developed by the action of external air pressure on the bulb. These stresses are permanently retained in the finished tubes. The air pressure induced stresses are mostly compression. Glass is very strong in compression and therefore these stresses typically are no problem. However, finite element analysis studies have shown that tensile stresses are developed on the surface of the side skirt of the panel and in the vicinity of the frit seal where the funnel is joined to the sides of the panel. Glass can withstand much less stress in tension than it can in compression. Accordingly, the bulb is subject to failure because of the tensile stresses.

Stresses are also induced by the cooling of the tube. During cooling the outside is cooler than the inside because heat can only escape through the outside surface. The magnitude of the thruwall temperature gradient is directly related to the cooling rate and the contribution to tensile stresses in the tube increases as the thruwall temperature gradient increases.

The tensile stresses resulting from the combined effects of atmospheric loading and cooling can be substantially reduced by maintaining a temperature gradient across the face of the panel during the evacuation process. Preferably, the temperature gradient is in the order of about 10° C. to 30° C. For the most common tube types presently used in television receivers, and for the larger sizes up to about 35 inch (89 cm) diagonal tubes, the temperature should be maintained at a higher value in the center of the tube and lower at the edges of the tube. Such a temperature gradient can be established by locating a small heating device, such as an electric resistance heater, in the proximity of the center of the panel. After the tube is evacuated to the desired internal pressure, the bulb is hermetically sealed, as indicated at step 10. The tube is then ready for additional processing, such as getter flashing, spot knocking and aging.

The invention is advantageous for several reasons. The three separate heat treatments which total approximately 7 hours for prior art methods are reduced to a single heat treatment of approximately 3 hours. A stronger bulb is produced because the aspiration during heating reduces the thickness of the frit seal. A cleaner bulb is produced because the bulb is evacuated as it cools down and the potential for contamination between the frit seal cycle and the evacuation cycle of the prior art methods is eliminated. The tensile stresses produced in the frit seal area by cooling and evacuation are reduced by applying a thermal gradient across the face of the panel during cool down.

What is claimed is:

1. A method of making a kinescope comprising the steps of:
   (i) producing a phosphor screen coated with an organic material on the inside surface of a panel having a seal edge;
   (ii) providing a funnel having a seal edge and a neck;
   (iii) placing a bead of frit material on one of said seal edges, and placing said panel on said funnel with said seal edges in alignment;
   (iv) supporting said funnel and said panel in a dedicated oven with said neck extending through one wall of said oven;
   (v) heating said funnel and said panel above the set temperature of said frit material to form a kinescope bulb by simultaneously,
      (a) raising the temperature inside said oven to said set temperature,
      (b) raising the temperature inside said kinescope bulb to minimize the thruwall temperature differential,
      maintaining the heating of steps v(a) and v(b) for a time period sufficient to set said frit material;

(vi) aspirating said kinescope bulb during said heating to remove organics and to create a negative pressure inside said kinescope bulb whereby air pressure presses said panel onto said funnel to improve the frit seal;

(vii) cooling said kinescope bulb by ceasing the heating of steps v(a) and v(b) while blowing a cool gas into said kinescope bulb;

(viii) mounting an electron gun in said kinescope bulb when said kinescope bulb is cooled to a predetermined temperature below said set temperature;

(ix) evacuating said kinescope bulb while maintaining a temperature gradient across the face of said panel to reduce stresses caused by the cooling and evacuation; and (x) hermetically sealing said kinescope bulb.

2. The method of claim 1 wherein the temperature gradient of step ix is highest in the proximity of the center of said panel.

3. The method of claim 2 wherein the heating of step v(b) is carried out by blowing a hot gas into said kinescope.

4. The method of claim 3 wherein the heating of step v(a) is carried out using radiant heat.

5. The method of claim 4 wherein the cool gas of step vii is ambient temperature.

6. The method of claim 5 wherein the temperature gradient of step ix is about 10° C. to 30° C.

7. The method of claim 3 wherein the heating of step v(a) is carried out using convection heat.

8. The method of claim 7 wherein the cool gas of step vii is ambient temperature.

9. The method of claim 8 wherein said temperature gradient of step ix is about 10° C. to 30° C.

10. The method of claim 2 wherein said temperature gradient of step ix is about 10° C. to 30° C.

11. The method of claim 10 wherein the heating of step v(b) is carried out by blowing a hot gas into said kinescope.

12. The method of claim 1 wherein the heating of step v(b) is carried out by blowing a hot gas into said kinescope.

13. The method of claim 12 wherein the heating of step v(a) is carried out using radiant heat.

14. The method of claim 13 wherein the cool gas of step vii is ambient temperature.

15. The method of claim 12 wherein the heating of step v(a) is carried out using convection heat.

16. The method of claim 15 wherein the cool gas of step vii is ambient temperature.

17. The method of claim 1 wherein the temperature gradient of step ix is lowest in the proximity of the center of said panel.

18. The method of claim 17 wherein the temperature gradient of step ix is about 10° C. to 30° C.

19. The method of claim 18 wherein the heating of step v(b) is carried out by blowing a hot into gas said kinescope.

20. The method of claim 19 wherein the cool gas of step vii is ambient temperature.

* * * * *